JOHN P. ANDERSON.

Improvement in Machines for Slicing Candy, &c.

No. 4,927. Reissued June 4, 1872.

WITNESSES { Thomas McIlvain
John Parker

John Price Anderson
by his Attys
Howson and Son

UNITED STATES PATENT OFFICE.

JOHN PRICE ANDERSON, OF PHILADELPHIA, PENNSYLVANIA.

IMPROVEMENT IN MACHINES FOR SLICING CANDY, &c.

Specification forming part of Letters Patent No. 117,589, dated August 1, 1871; reissue No. 4,927, dated June 4, 1872.

Specification describing an Improvement in Machines for Cutting Candy, &c., invented by JOHN PRICE ANDERSON, of Philadelphia, county of Philadelphia and State of Pennsylvania.

*Improvement in Machines for Slicing Candy, &c.*

My invention consists of certain mechanism (too fully explained hereafter to need preliminary description) for cutting or slicing, with a shearing effect, candy, tobacco, paper, and other materials.

Figure 1:
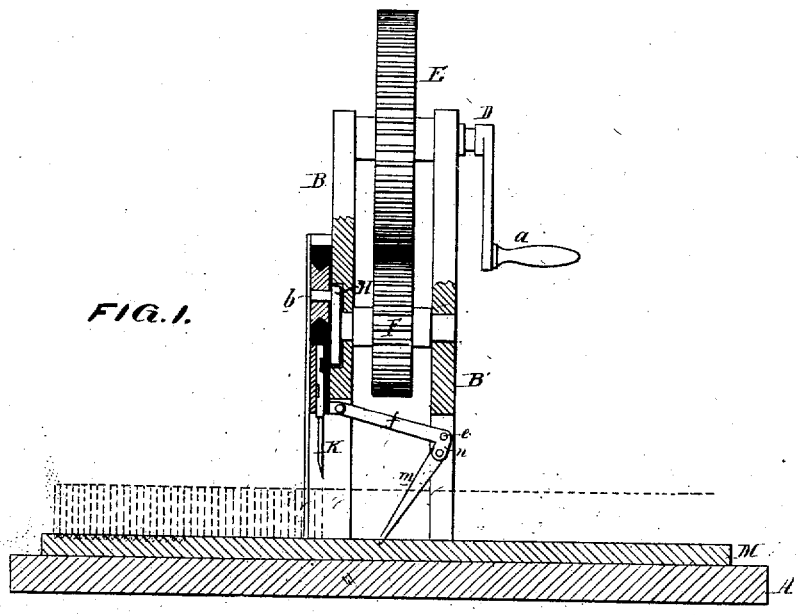
Figure 2:
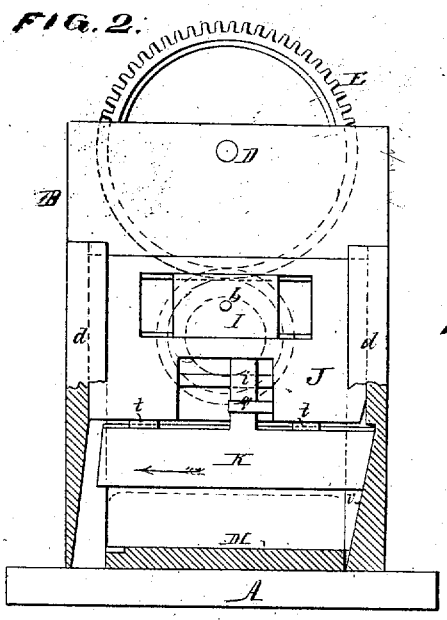
Figure 3:
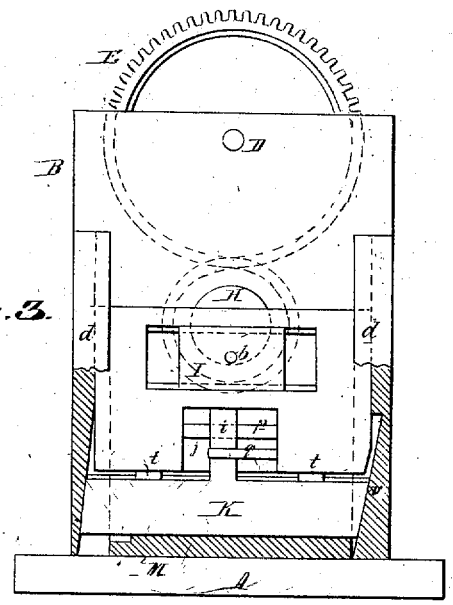

In the accompanying drawing, Figure 1 is a vertical section of my machine for slicing candy, &c.; Fig. 2, a front view, partly in section, with the knife elevated; Fig. 3, the same with the knife depressed.

To a table, A, are secured two standards, B and B′, to suitable bearings, at the top of which is adapted a shaft, D, furnished with a handle, *a*, or, if desired, with a pulley for receiving a belt from an adjacent driving-shaft. To this shaft D is secured a cog-wheel, E, gearing into a pinion, F, on a shaft, G, which also turns in the standards B and B′, and which has at one end a crank, H, the pin *b* of the latter fitting into a hole in a slide, I, adapted to horizontal V-shaped guides in a cross-head, J, adapted to vertical guides on the standard B′. K is the knife, having a beveled end, *u*, adapted to an inclination, *v*, in the standard B, which inclination, on the depression of the knife, has a tendency to move the same in the direction of the arrow, Fig. 2. The upper rounded edge of the knife is arranged to bear against concave projections *t t* on the lower edge of the cross-head J, and in the latter is a recess, *j*, for receiving the projection *i* of the knife, the said recess being large enough to permit the lateral play of this projection, which has at the back a groove adapted to a guiding-rib, P, the latter thus serving to suspend the knife from the cross-head. A strip, *q*, of rubber or any other suitable spring, has a tendency to draw the knife laterally in a direction contrary to that pointed out by the arrow, Fig. 2, when said knife is elevated.

The candy or other material to be sliced is placed on a bed, M, which is arranged to slide between guides on the table A, and which has ratchet-teeth for receiving the end of a pawl, *m*, hung to an arm, *n*, on a spindle, *e*, on the standard B′, the said spindle having an arm, *f*, through a slot, in which passes a pin on the cross-head J. When the cross-head is elevated the knife will occupy the position shown in Fig. 2; but on turning the crank-wheel H the cross-head will be depressed, and the knife will, owing to the inclination *v* on the standard B′, be forced in the direction of the arrow, Fig. 2, simultaneously with its descent, and it must therefore act on the candy or other material with a shearing cut, and the same effect will be produced, whether the vertical reciprocating movement is imparted from the rotating shaft to the knife, through the medium of the devices described, or any other equivalent mechanism. On raising the knife the spring *q* will have a tendency to restore it to its original position as it ascends.

Through the medium of the mechanism described the bed M will be moved forward as the cross-head rises, and the candy or other material will be presented to the action of the knife, so as to be cut by the latter into uniform slices.

Although I have alluded to candy as the material on which the knife has to operate, the mechanism may be used for cutting tobacco, paper, or, in fact, any other material which admits of being severed by a knife operating with a shearing effect.

I claim—

1. The knife K, to which a vertical reciprocating motion is imparted from a rotating shaft through the medium of the devices described, or their equivalents, and which is controlled by a stationary inclined plane, all substantially as set forth.

2. The combination of the cross-head J, knife K and its projection *i*, guided in a recess of the cross-head, and the spring *q* or its equivalent.

3. The combination of the cross-head and knife, arranged to operate in the manner described, with the sliding bed M, and the devices herein described, or their equivalents, for causing the cross-head to feed the bed forward.

In testimony whereof I have signed my name to this specification in the presence of two subscribing witnesses.

Witnesses: J. P. ANDERSON.

WM. A. STEEL,

HARRY SMITH.